(12) United States Patent
Eitel et al.

(10) Patent No.: US 7,041,781 B2
(45) Date of Patent: May 9, 2006

(54) THERMOPLASTIC MOLDING COMPOUNDS WITH IMPROVED SURFACE PROPERTIES AND IMPROVED STRUCTURAL HOMOGENEITY

(75) Inventors: Alfred Eitel, Johann (AT); Michael König, Shanghai (CN); Dorothy Rose, Dormagen (DE); Hans-Bernhard Hauertmann, Dormagen (DE); Heinrich Alberts, Odenthal (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/296,692

(22) PCT Filed: May 21, 2001

(86) PCT No.: PCT/EP01/05781

§ 371 (c)(1),
(2), (4) Date: May 19, 2003

(87) PCT Pub. No.: WO01/92379

PCT Pub. Date: Dec. 6, 2001

(65) Prior Publication Data

US 2003/0189014 A1    Oct. 9, 2003

(30) Foreign Application Priority Data

Jun. 2, 2000 (DE) ............................... 100 27 334
Oct. 5, 2000 (DE) ............................... 100 49 206

(51) Int. Cl.
C08F 6/00 (2006.01)

(52) U.S. Cl. .................. 528/502; 264/176.1; 264/219; 528/193; 528/194; 528/196; 528/198; 528/271; 528/272; 528/340

(58) Field of Classification Search ............. 264/176.1, 264/219; 528/193, 194, 196, 198, 271, 272, 528/340
See application file for complete search history.

(56) References Cited

U.S. PATENT DOCUMENTS

| 4,747,959 A | 5/1988 | Ho et al. ..................... 210/768 |
| 5,242,596 A | 9/1993 | Bachem et al. ............. 210/644 |
| 5,407,586 A | 4/1995 | Gneuss ........................ 210/780 |
| 5,498,334 A | 3/1996 | Gneuss ........................ 210/236 |
| 2004/0082714 A1* | 4/2004 | Miyamoto et al. .......... 524/700 |

FOREIGN PATENT DOCUMENTS

| DE | 42 27 137 | 2/1994 |
| EP | 0 272 441 | 6/1998 |
| JP | 2002-226790 | * 2/2001 |
| SU | 1723588 | 3/1992 |

OTHER PUBLICATIONS

Houben Weyl XIV/1, Makromolekulare Stoffe 2, p. 348-356, (month unavailable) 1961.
H. Logemann "Allegeines zur Polymersation in heterogener Phase".

* cited by examiner

Primary Examiner—Terressa Boykin
(74) Attorney, Agent, or Firm—Jill Denesvich

(57) ABSTRACT

Homo- and/or copolymers of one or more ethylenically unsaturated monomers, suitable for the preparation of molded articles that feature improved properties, especially improved fracture properties, heat stability and notched impact strength are disclosed. These homo- and/or copolymers are characterized in that they contain less than 400 particles per $m^2$ of surface area with a diameter greater than 200 μm.

Figure 1:
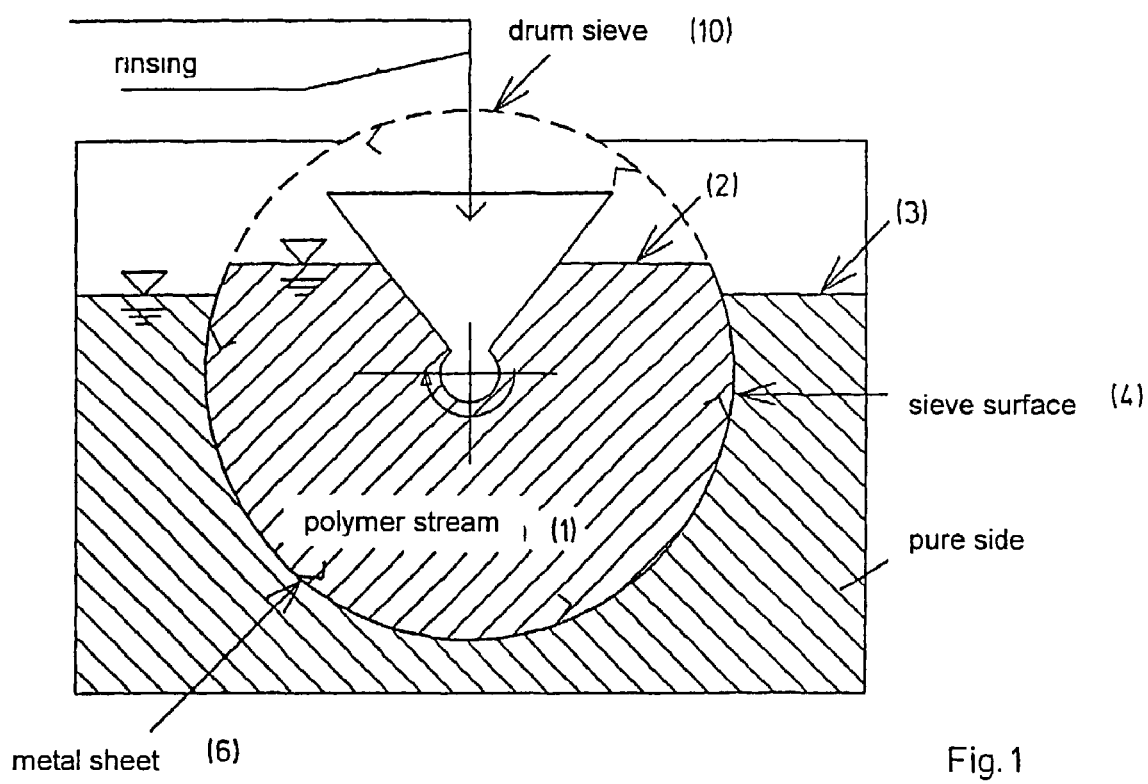

2 Claims, 2 Drawing Sheets ered to homo- and/or copolymers
THERMOPLASTIC MOLDING COMPOUNDS WITH IMPROVED SURFACE PROPERTIES AND IMPROVED STRUCTURAL HOMOGENEITY The present invention relates to homo- and/or copolymers and thermoplastic moulding compositions with improved surface and structural homogeneity, as well as the use thereof and a process for the preparation.

Thermoplastic moulding compositions, in particular those which comprise homo- and/or copolymers of one or more ethylenically unsaturated monomers, polycarbonates and polyesters, are known from a large number of publications. This applies in particular to the use of ABS polymers. The following documents may be referred to merely by way of example: DE-A-19 616 968, WO 97/40 092, EP-A-728 811, EP-A-315 868 (=U.S. Pat. No. 4,937,285), EP-A-0 174 493 (U.S. Pat. No. 4,983,658), U.S. Pat. No. 5,030,675, JA-59 202 240, EP-A-0 363 608 (=U.S. Pat. No. 5,204,394), EP-A-0 767 204, EP-A-0 611 798, WO 96/27 600 and EP-A-0 754 531.

Polymers always have a particle size distribution. To improve the properties it is essential to remove certain higher molecular weight contents. In particular, these produce undesirable surface effects in the finished component and inhomogeneities which lead to fracture of the components under mechanical stress.

Removal of inhomogeneities in the melt of the polymers leads to only unsatisfactory results. Filtration of the melt necessarily takes place under a high pressure. Larger inhomogeneities may be forced through the sieve here in a deformed form. The inhomogeneity persists (e.g. DE-A-4 227 137, U.S. Pat. No. 5,498,334, U.S. Pat. No. 5,407,586 and SU-A-1 723 588).

A better possibility is for the polymer latices already to be purified.

It is known from the prior art to filter polymer latices to remove impurities or coarse, contents. Thus, for example, Houben Weyl XIV/1, Makromolekulare Stoffe 1, pages 348 to 356 (Georg Thieme Verlag, Stuttgart, 1961) and DE-A-4 126 483 and U.S. Pat. No. 4,747,959 describe the filtration of rubber latices. No connections with the surface properties and structural homogeneity are known from this prior art.

On a large industrial scale, the abovementioned filtration is achieved only unsatisfactorily with the often tacky, somewhat elastic and not particularly shear-stable particles of the latices, since the service lives of the filters are only short. Thus e.g. the service life for a bag filter of 250 µm mesh width for purification of a latex is only minutes to a few hours. The filter area is then reduced in size to the extent that no further flow-through takes place.

The obstacle to filtration is due to blocking of the holes and a filter cake which has formed on the filter.

Sieving of polymer latices is known. During sieving minimal pressure differences are used and the risk of re-formation of larger particles is minimized. Machines in which the latices run over flat sieves which are in motion in order to effect cleaning of the holes are employed for the sieving. Circular sieves which are caused to vibrate for cleaning can also be used. Curved sieves are also proposed.

All these sieves have a number of disadvantages: They are very personnel-intensive, since frequent blockages occur and the self-cleaning does not function. Sieving must then be stopped and the sieve must be cleaned by various procedures.

Another serious disadvantage is that the sieve described above cannot be installed in a closed construction, so that severe contamination of the environment occurs due to residual monomers gassing out. Even in the case of enclosure in a housing, pollution of the environment is still to be expected due to the frequent cleaning procedure.

The object of the present invention is accordingly to provide homo- and/or copolymers which are distinguished by improved structural and surface homogeneity and improved properties, in particular in respect of fracture properties, heat stability and notched impact strength.

The object of the present invention is furthermore to provide an advantageous process for the preparation of homo- and/or copolymers which does not have the abovementioned disadvantages.

BRIEF DESCRIPTION OF FIGS.

FIG. 1. illustrates a front view of a drum sieve in accordance with a process of the present invention by which polymers and/or co-polymers are obtained by means of sieving over the drum sieve.

Figure 2:
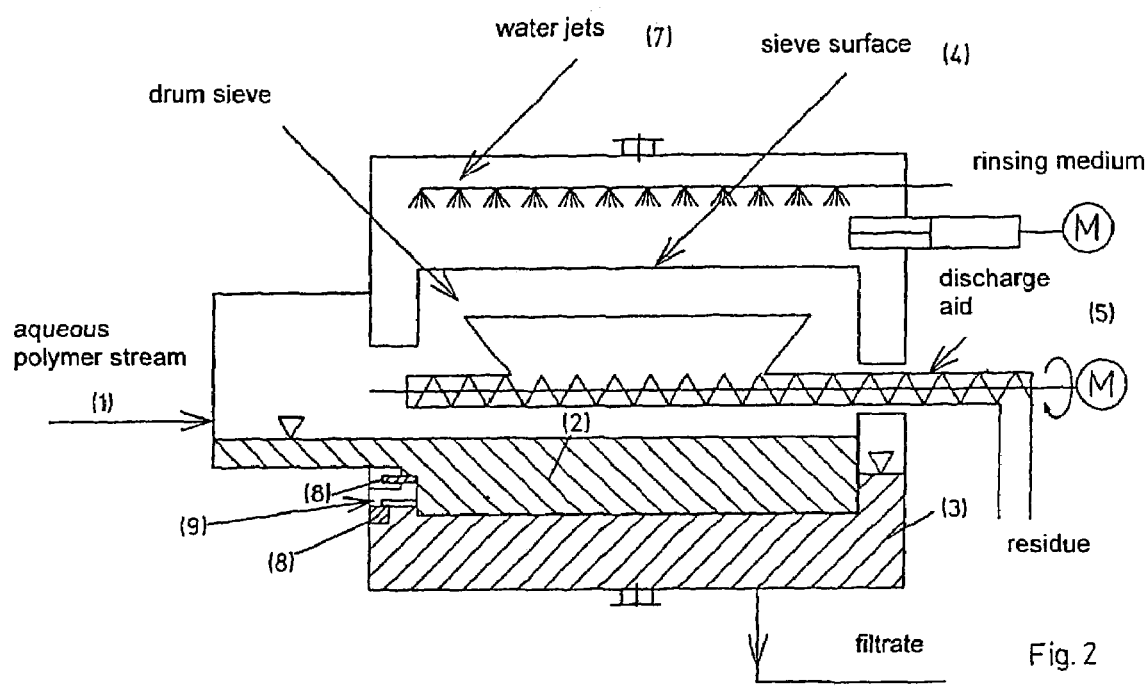

FIG. 2 illustrates a side view of another embodiment of a drum sieve in accordance with a process by which polymers and/or co-polymers are obtained by means of sieving over the drum sieve.

It has been found that homo- and/or copolymers of one or more ethylenically unsaturated monomers ("vinyl monomers") which comprise less than 400 particles per $m^2$ of surface area with a diameter greater than 200 µm have the properties according to the invention.

The determination of the particles with a diameter greater than 200 µm per $m^2$ of surface area is carried out with an FS-3 film quality test apparatus from OCS GmbH, Witten, Germany. (See the preparation and testing of the moulding compositions according to the invention)

The present invention therefore provides homo- or copolymers of one or more ethylenically unsaturated vinyl monomers, characterized in that less than 400 particles have a diameter greater than 200 µm per $m^2$ of surface area.

Preferred homo- and/or copolymers are characterized in that they comprise less than 200 particles per $m^2$ with a diameter of >200 µm, particularly preferably in that they comprise less than 500 particles per $m^2$ of surface area with a diameter of 100 to 200 µm, and in particular in that they comprise less than 2,500 particles per $m^2$ of surface area with a diameter of 50 to 100 µm.

The abovementioned homopolymers or copolymers of ethylenically unsaturated monomers are employed according to the invention. Mixtures of various homo-and/or copolymers are also suitable.

The following are possible in particular:
rubber-free vinyl polymers (A.1),
rubber-containing vinyl polymers, e.g. graft polymers of vinyl monomers on a rubber (A.2),
mixtures of rubber-free (A.1) and rubber-containing (A.2) vinyl polymers.

The ethylenically unsaturated monomers are preferably chosen from the group consisting of mono- or polyunsaturated olefins (such as, for example and preferably, ethylene, propylene, chloroprene, 1,3-butadiene and isoprene), vinyl acetate, styrene, α-methylstyrene, styrenes substituted on the nucleus, vinyl cyanides (such as, for example and preferably, acrylonitrile and methacrylonitrile), maleic anhydride, N-substituted maleimides and $C_1$–$C_8$-alkyl acrylates and methacrylates (such as, for example and preferably, methyl acrylate and methyl methacrylate).

Particularly preferred vinyl polymers A.1 are (co)polymers of on the one hand styrene, α-methylstyrene, styrene substituted on the nucleus or mixtures (A.1.1) and on the other hand acrylonitrile, methacrylonitrile, (meth)acrylic acid $C_1$–$C_8$-alkyl esters, maleic anhydride, N-substituted maleimide or mixtures (A.1.2).

The (co)polymers can preferably comprise 50 to 98 wt. % A.1.1and 50 to 2 wt. % A.1.2.

Very particularly preferred (co)polymers A.1 are those of styrene, acrylonitrile and optionally methyl methacrylate, of α-methylstyrene, acrylonitrile and optionally methyl methacrylate, and of styrene, α-methylstyrene, acrylonitrile and optionally methyl methacrylate.

The homo- and copolymers can be prepared by freeradical polymerization, in particular by emulsion, suspension, solution or bulk polymerization. The (co)polymers A.1 preferably have molecular weights $\overline{M}_w$ (weight-average, determined by light scattering or sedimentation) of 15,000 to 200,000.

Further particularly preferred (co)polymers A.1 are randomly built-up copolymers of styrene and maleic anhydride, which e.g. can be prepared from the corresponding monomers. by a continuous bulk or solution polymerization with incomplete conversions. Their composition can be varied within wide limits. They preferably contain 5 to 25 wt. % of maleic anhydride units.

Instead of styrene, these polymers can also comprise styrenes substituted on the nucleus, such as p-methylstyrene, vinyltoluene, 2,4-dimethylstyrene and other substituted styrenes, such as α-methylstyrene.

The rubber-containing vinyl polymers A.2 include e.g. graft (co)polymers with rubber-elastic properties, which are substantially obtainable from at least two of the following monomers: chloroprene, 1,3-butadiene, isoprene, styrene, α-methylstyrene, acrylonitrile, ethylene, propylene, vinyl acetate and $C_1$–$C_8$-alkyl acrylates and methacrylate. Such polymers are described e.g. in "Methoden der Organischen Chemie" (Houben-Weyl), vol. 14/1, Georg Thieme-Verlag, Stuttgart, 1961, p. 393–406 and in C. B. Bucknall, "Toughened Plastics", Appl. Science Publishers, London 1977. In general, the polymers A.2 are partly crosslinked and in general have gel contents of more than 20 wt. %, preferably more than 40 wt. %.

Preferred rubber-like vinyl polymers A.2 are graft polymers of:

A.2.1 5 to 95, preferably 30 to 80 parts by wt. of a mixture of
A.2.1.1 50 to 95 parts by wt. of styrene, α-methylstyrene, styrenes substituted on the nucleus by halogen or methyl, (meth)acrylic acid $C_1$–$C_8$-alkyl esters or mixtures of these compounds and
A.2.1.2 5 to 50 parts by wt. of acrylonitrile, methacrylonitrile, (meth)acrylic acid $C_1$–$C_8$-alkyl esters, maleic anhydride, maleimides N-substituted by $C_1$–$C_4$-alkyl or phenyl or mixtures of these compounds on
A.2.2 5 to 95, preferably 20 to 70 parts by wt. of rubber polymer having a glass transition temperature below −10° C.

Preferred graft polymers A.2 are e.g. polybutadienes, butadiene/styrene copolymers and acrylate rubbers grafted with styrene and/or acrylonitrile and/or alkyl acrylates or methacrylates; i.e. copolymers of the type described in DE-A 1 694 173 (=U.S. Pat. No. 3,564,077); and polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, such as are described e.g. in DE-A 2 348 377 (=U.S. Pat. No. 3,919,353).

Particularly preferred polymers A.2 are ABS polymers, such as are described e.g. in DE-A 2 035 390 (=U.S. Pat. No. 3, 644, 574) and in DE-A 2 248 242 (=GB-A 1 409 275). Graft rubbers with rubber contents of at least 50 wt. %, preferably at least 55 wt. %, are particularly preferred according to the invention.

Particularly preferred graft polymers A.2 are obtainable by grafting polymerization of
α. 10 to 70, preferably 15 to 50, in particular 20 to 40 wt. %, based on graft polymer A.2, of acrylic acid esters or methacrylic acid esters or of 10 to 70, preferably 15 to 50, in particular 20 to 40 wt. % of a mixture of 10 to 50, preferably 20 to 35 wt. %, based on the mixture, of acrylonitrile, acrylic acid esters or methacrylic acid esters and 50 to 90, preferably 65 to 80 wt. %, based on the mixture, of styrene or styrenes substituted on the nucleus or a mixture thereof (as grafting substance A.2.1) on
β30 to 90, preferably 50 to 85, in particular 60 to 80 wt. %, based on graft polymer A.2, of a butadiene polymer with at least 50 wt. %, based on β, of butadiene radicals (as graft base A.2.2).

In general, the gel content of graft base β is at least 20 wt. % (measured in toluene) and the degree of grafting G is 0.15 to 0.95. The degree of grafting G can also be 0.15 to 0.55.

Acrylic acid esters or methacrylic acid esters α are esters of acrylic acid or methacrylic acid and monohydric alcohols having 1 to 8 C atoms. Methyl methacrylate, ethyl methacrylate, propyl methacrylate, n-butyl acrylate, t-butyl acrylate and t-butyl methacrylate are particularly preferred.

In addition to butadiene radicals, the butadiene polymer β can contain up to 50 wt. %, based on β, of radicals of other ethylenically unsaturated monomers, such as styrene, acrylonitrile, $C_1$–$C_4$-alkyl esters of acrylic or methacrylic acid (such as methyl acrylate, ethyl acrylate, methyl methacrylate or ethyl methacrylate), vinyl esters and/or vinyl ethers. Polybutadiene is preferred.

As is known, the grafting monomers are not completely polymerized on to the graft base in the grafting polymerization; according to the invention, however, graft polymers A.2 include products which are obtained by polymerization of the grafting monomers in the presence of the graft base.

Further particularly preferred polymers A.2 are graft polymers of
τ. 20 to 90 wt. %, based on A.2, of acrylate rubber having a glass transition temperature below −20° C. as graft base A.2.2 and
δ. 10 to 80 wt. %, based on A.2, of at least one polymerizable, ethylenically unsaturated monomer as grafting monomer A.2.1.

The acrylate rubbers of polymers A.2 are preferably polymers of acrylic acid alkyl esters, optionally with up to 40 wt. %, based on τ, of other polymerizable, ethylenically unsaturated monomers. Preferred polymerizable acrylic acid esters include $C_1$–$C_{12}$-alkyl esters, preferably $C_1$–$C_8$-alkyl esters, for example the methyl, ethyl, butyl, n-octyl and 2-ethyl-hexyl esters; halogenoalkyl esters, preferably halogeno-$C_1$–$C_8$-alkyl esters, such as chloroethyl acrylate, and mixtures of these monomers.

For crosslinking, monomers with more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms or saturated polyols having 2 to 4 OH groups and 2 to 20 C atoms, such as e.g. ethylene glycol dimethacrylate and allyl methacrylate; polyunsaturated heterocyclic compounds, such as e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which contain at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of crosslinking monomers is preferably 0.02 to 5, in particular 0.05 to 2 wt. %, based on graft base τ.

In the case of cyclic crosslinking monomers with at least 3 ethylenically unsaturated groups, it is advantageous to limit the amount to less than 1 wt. % of graft base τ.

Preferred "other" polymerizable, ethylenically unsaturated monomers which can optionally be used for the preparation of the graft base, in addition to the acrylic acid esters, are e.g. acrylonitrile, styrene, α-methylstyrene, acrylamides, vinyl $C_1$–$C_6$-alkyl ethers, methyl methacrylate and butadiene. Preferred acrylate rubbers as graft base τ are emulsion polymers which have a gel content of at least 60 wt. %.

Further suitable graft bases according to A.2.2 are silicone rubbers with grafting-active sites, such as are described in DE-A 37 04 657, DE-A 37 04 655, DE-A 36 31 540 and DE-A 36 31 539.

The gel content of graft base A.2.2 is determined at 25° C. in dimethylformamide (M. Hoffmann, H. Krömer, R. Kuhn, Polymeranalytik I und II, Georg Thieme-Verlag, Stuttgart 1977).

Graft polymers A.2 can be prepared by known processes, such as bulk, suspension, emulsion or bulk-suspension processes.

Surprisingly, it has been found that sieving off of the coarse contents of the polymer formed is achieved with a suitable form of drum sieves without the disadvantages described in the case of emulsion and/or suspension polymerization.

The invention therefore provides, as already mentioned, an advantageous process for the preparation of homo- and/or copolymers by means of emulsion and/or suspension polymerization which contain less than 400 particles greater than 200 µm per m² of surface area, characterized in that a drum sieve with an average mesh width of ≦200 µm is used for purification of the polymers.

The aqueous polymer stream to be purified is passed here into a drum over which is stretched a suitable sieve fabric and which rotates slowly or in cycles. A difference in level between the inside and outside generates a hydrostatic pressure difference which serves as the driving gradient for the filtration. Coarse contents which remain (determined by the mesh width of the sieve) are transported away from the filtration site by the rotary movement of the drum and are removed in the upper part of the drum by means of spraying and also under pressure by suitable rinsing media and suitable scrapers.

No blockage of the sieve holes is to be observed.

Drum sieves are usually used for washing and classifying gravel or for special sieving operations in clarification plants or recycling plants.

Homo- and/or copolymers which contain less than 400 particles of 200 µm size per m² of surface area are obtained by the process according to the invention. Products with less than 200 particles of >200 µm per m² of surface area are particularly preferred.

The sieving of the polymer stream can be carried out semi-continuously or completely continuously.

The homo- and/or copolymers are obtained according to the invention by means of sieving over a drum sieve in the manner described below.

Sieving over drum sieves ((10) FIG. 1) with an average mesh width of ≦200 µm is preferred according to the invention. Mesh widths of ≦150 µm are particularly preferred. Mesh widths of ≦100 µm are most preferred.

All known materials are possible for the sieves. These include, for example, metals or fabric of all types. Drum sieves are known. All known drum sieves which have the required mesh width can be employed as the drum sieves. The homo- and/or copolymers according to the invention prepared by means of the process according to the invention are distinguished by a significant improvement in their mechanical properties. In particular, the surfaces, the heat stability and the notched impact strength are improved to an unforeseeable degree.

The process according to the invention is shown in FIGS. 1 and 2 and proceeds as follows:

The polymer stream to be filtered is passed into the inside of the sieve drum. A hydrostatic pressure difference is generated by a small difference in the filling level between the drum interior (2) and drum exterior (3), which causes passage of the polymer stream through the filter medium. Solids contained in the polymer stream remain on the sieve surface (4) and can be discharged from the drum from there.

In order to prevent damage to the polymer or blockage due to coagulation on the sieve surface, the difference in filling height should not be too great. The limit for the difference in filling level is given by the maximum tolerated shear forces for the particular polymer on passage through the sieve fabric. The difference in filling height is recorded via process control measuring equipment. If the difference in filling height exceeds a preset value of approx. 10 cm, the drum is rotated at 1–60 $rpm^{-1}$ by means of a drive. During the rotary movement, solids deposited on the sieve surface fall into a mechanical discharge aid (FIG. 2, (5)) located inside the drum, from which they flow out as a function of the consistency or can be discharged by means of this mechanical discharge aid and can be disposed of.

Suitably shaped metal sheets (6) are located inside the drum and assist the carrying away of the solids.

If the set value of the difference in filling level is not achieved by this rotary movement, the sieve is cleaned by means of a series of water jets (FIG. 2 (7)) located above the drum.

The hydrostatic pressure difference between the crude and pure side of the filter can cause specification-infringing leakages. The drum seal which seals around the entire circumference is therefore provided with two seals (8), between which is a control space (9) into which the leakage flows, so that the purified emulsion is not rendered impure (contaminated).

The homo- and/or copolymers according to the invention prepared by means of the sieving described are distinguished by a significant improvement in their mechanical properties. In particular, the elongation at break, surface properties, structural homogeneity and therefore notched impact strength are improved to an unforeseeable degree.

According to the invention, the homo- and copolymers described can be replaced in part by other thermoplastics. The other thermoplastics are preferably chosen from at least one thermoplastic of the group consisting of polycarbonates, polyester-carbonates, polyesters and conventional (co)polymers according to component A.1 described above, but without the coarse content, according to the invention, of particles.

The homo- and/or copolymers according to the invention and the mixture thereof with other thermoplastics can furthermore comprise further additives chosen from at least one of the group consisting of flameproofing agents, anti-dripping agents, very finely divided inorganic compounds and fillers and reinforcing substances, as well as conventional additives (see below).

Mixtures of rubber-free (A.1) and rubber-containing vinyl polymers (A.2) preferably comprise a) 0.5 to 90 parts by wt., preferably 10 to 80 parts by wt., in particular 20 to 70 parts by wt. of A.1 and b) 10 to 99.5 parts by wt., preferably 20 to 90 parts by wt., in particular 80 to 30 parts by wt. of A.2 (based on A.1 and A.2)

wherein at least one component A.1 or A.2 is characterized in that the polymers A.1 or A.2 contain less than 400 particles per $m^2$ of surface area with a diameter of greater than 200 μm, or have the abovementioned preferred definitions.

Mixtures according to the invention are furthermore also those which comprise A.1) or A.2) or a mixture of A.1) and A.2) and other thermoplastics and optionally further additives. Other thermoplastics are preferably chosen from the group consisting of polycarbonates, polyester-carbonates, polyalkylene terephthalates, polyamides or mixtures thereof.

The compositions preferably comprise c) 10 to 90 parts by wt., in particular 20 to 85 parts by wt., very particularly preferably 35 to 80 parts by wt. of polycarbonate, polyester-carbonate, polyalkylene terephthalate or mixtures thereof or polyamide, d) 90 to 10 parts by wt., preferably 80 to 15 parts by wt., in particular 60 to 20 parts by wt. of A.1 or A.2 or mixtures thereof, the sum of the parts by weight of all the components being 100, with the proviso that at least one component A.1 or A.2 comprises less than 400 particles per $m^2$ of surface area with a diameter greater than 200 μm or has the abovementioned preferred definitions.

Suitable polycarbonates and/or polyester-carbonates are known from the literature or can be prepared by processes known from the literature (for the preparation of aromatic polycarbonates see, for example, Schnell, "Chemistry and Physics of Polycarbonates", Interscience Publishers, 1964 and DE-A 1 495 626, DE-OS 2 232 877, DE-A 2 703 376, DE-A 2 714 544, DE-A 3 000 610 and DE-A 3 832 396; for the preparation of aromatic polyester-carbonates see e.g. DE-A 3 077 934).

Suitable polyalkylene terephthalates and polycarbonates are described, for example, in DE-A 4 436 776 (=U.S. Pat. No. 5,658,974).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents which are trifunctional or more than trifunctional, for example triphenols or tetraphenols.

Diphenols for the preparation of the aromatic polycarbonates and/or aromatic polyester-carbonates are preferably those of the formula (I)

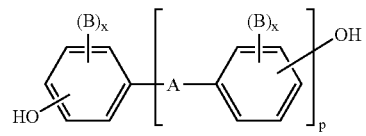

wherein

A is a single bond, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, to which further aromatic rings optionally containing heteroatoms can be fused, or a radical of the formula (II) or (III)

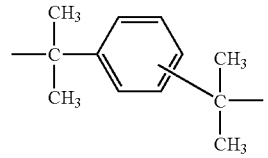

B in each case is $C_1$–$C_{12}$-alkyl, preferably methyl, or halogen, preferably chlorine and/or bromine, x in each case independently of one another, is 0, 1 or 2 and p is 1 or 0, and $R^1$ and $R^2$ can be chosen individually for each $X^1$ and independently of one another are hydrogen or $C_1$–$C_6$-alkyl, preferably hydrogen, methyl or ethyl, $X^1$ is carbon and m is an integer from 4 to 7, preferably 4 or 5, with the proviso that on at least one atom $X^1$, $R^1$ and $R^2$ are simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol A, 2,4-bis(4-hydroxyphenyl)-2-methylbutane, 1,1-(hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-Bis-(4-hydroxyphenyl)-propane (bisphenol A) is particularly preferred.

The diphenols can be employed individually or as any desired mixtures.

The diphenols are known from the literature or are obtainable by processes known from the literature.

Suitable chain terminators for the preparation of the thermoplastic aromatic polycarbonates are, for example, phenol, p-chlorophenol, p-tert-butylphenol or 2,4,6-tribromophenol, and also long-chain alkylphenols, such as 4-(1,3-tetramethylbutyl)-phenol according to DE-OS 2 842 005 or monoalkylphenols or dialkylphenols having a total of 8 to 20 C atoms in the alkyl substituents, such as 3,5- di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the molar sum of the particular diphenols employed.

The thermoplastic aromatic polycarbonates have average weight-average molecular weights ($\overline{M}_w$, measured e.g. by ultracentrifuge or scattered light measurement) of 10,000 to 200,000, preferably 20,000 to 80,000.

The thermoplastic aromatic polycarbonates can be branched in a known manner, and in particular preferably by incorporation of 0.05 to 2.0 mol %, based on the sum of diphenols employed, of compounds which are trifunctional or more than trifunctional, for example those with three or more phenolic groups.

Both homopolycarbonates and copolycarbonates are suitable. To prepare copolycarbonates according to the invention, 1 to 25 wt. %, preferably 2.5 to 25 wt. % (based on the total amount of diphenols to be employed), of polydiorganosiloxanes with hydroxy-aryloxy end groups can also be employed. These are known (see, for example, U.S. Pat. No. 3,419,634) or can be prepared by processes known from the literature. The preparation of copolycarbonates comprising polydiorganosiloxanes is described e.g. in DE-A 3 334 782.

Preferred polycarbonates are, in addition to the bisphenol A homopolycarbonates, the copolycarbonates of bisphenol A with up to 15 mol %, based on the molar sum of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester-carbonates are preferably the di-acid dichlorides of isophtha acid, terephthalic acid, diphenyl ether-4,4'-dicarboxylic acid and naphthalene-2,6-dicarboxylic acid.

Mixtures of the di-acid dichlorides of isophthalic acid and terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain terminators for the preparation of the aromatic polyester-carbonates are, in addition to the monophenols already mentioned, also chlorocarbonic acid esters thereof and the acid chlorides of aromatic monocarboxylic acids, which can optionally be substituted by $C_1$–$C_{22}$-alkyl groups or by halogen atoms, as well as aliphatic $C_2$–$C_{22}$-monocarboxylic acid chlorides.

The amount of chain terminators is in each case 0.1 to 10 mol %, based on the moles of diphenols in the case of the phenolic chain terminators and on the moles of dicarboxylic acid dichlorides in the case of monocarboxylic acid chloride chain terminators.

The aromatic polyester-carbonates can also comprise incorporated aromatic hydroxycarboxylic acids.

The aromatic polyester-carbonates can be either linear or branched in a known manner (for this see also DE-A 2 940 024 and DE-A 3 007 934).

Branching agents which can be used are, for example, carboxylic acid chlorides which are 3-functional or more than 3-functional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol % (based on the dicarboxylic acid dichlorides employed), or phenols which are 3-functional or more than 3-functional, such as phloroglucinol, 4,6-dimethyl-2,4,6-tri-(4-hydroxyphenyl)-heptene, 2,4,4-dimethyl-2,4,6-tri-(4-hydroxlphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane or 1,4-bis [4,4'-dihydroxytri-phenyl]-methyl]-benzene, in amounts of 0.01 to 1.0 mol %, based on the diphenols employed. Phenolic branching agents can be initially introduced into the reaction vessel with the diphenols, and acid chloride branching agents can be introduced together with the acid dichlorides.

The content of carbonate structural units in the thermoplastic aromatic polyester-carbonates can vary as desired. The content of carbonate groups is preferably up to 100 mol %, in particular up to 80 mol %, particularly preferably up to 50 mol %, based on the sum of ester groups and carbonate groups. Both the ester and the carbonate content of the aromatic polyester-carbonates can be present in the polycondensate in the form of blocks or in random distribution.

The relative solution viscosity ($\eta_{rel}$) of the aromatic polycarbonates and polyester-carbonates is in the range from 1.18 to solutions of 0.5 g polycarbonate or polyester-carbonate in 100 ml methylene chloride solution at 25° C.).

The thermoplastic aromatic polycarbonates and polyester-carbonates can be employed by themselves or in any desired mixture with one another.

The polycarbonates can also be replaced in part by polyesters.

Preferred polyesters are polyalkylene terephthalates. These are reaction products of aromatic dicarboxylic acids (or their reactive derivatives, e.g. dimethyl esters or anhydrides) and aliphatic, cycloaliphatic or arylaliphatic diols and mixtures of such reaction products.

Preferred polyalkylene terephthalates can be prepared by known methods from terephthalic acids (or their reactive derivatives) and aliphatic and cycloaliphatic diols having 2 to 10 C atoms (Kunststoff-Handbuch, volume VIII, p. 695 et seq. Carl Hanser Verlag, Munich 1973).

Preferred polyalkylene terephthalates contain 80 to 100, preferably 90 to 100 mol %, based on the dicarboxylic acid component, of terephthalic acid radicals and 80 to 100, preferably 90 to 100 mol %, based on the diol component, of ethylene glycol radicals and/or butane-1,4-diol radicals. In addition to terephthalic acid radicals, they contain 0 to 20 mol % of radicals of other aromatic dicarboxylic acids having 8 to 14 C atoms or aliphatic dicarboxylic acids having 4 to 12 C atoms, such as radicals of phthalic acid, isophthalic acid, naphthalene-2,6-dicarboxylic acid, 4,4'-diphenyldicarboxylic acid or succinic, adipic, sebacic, azelaic or cyclohexanediacetic acid. In addition to ethylene glycol radicals and/or butane-1,4-diol radicals, they contain 0 to 20 mol % of other aliphatic diols having 3 to 12 C atoms or cycloaliphatic diols having 6 to 12 C atoms, e.g. radicals of pentane-1,5-diol, hexane-1,6-diol, cyclohexane-1,4-dimethanol, 3-methylpentane-1,3-diol and -1,6-diol, 2-ethylhexane-1,3-diol, 2,2-diethylpropane-1,3-diol, hexane-2,5-diol, 1,4-di-(β-hydroxyethoxyphenyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-A 2 407 647, 2 407 776 and 2 715 932).

The polyalkylene terephthalates can be branched by incorporation of relatively small amounts of 3- or 4-hydric alcohols or 3- or 4-basic carboxylic acids, such as are described in DE-A 1 900 270 and U.S. Pat. No. 3,692,744. Examples of preferred branching agents are trimesic acid, trimellitic acid, trimethylolethane and -propane and pentaerythritol. It is advisable to use not more than 1 mol % of the branching agent, based on the acid component.

Polyalkylene terephthalates which have been prepared solely from terephthalic acid (or reactive derivatives thereof, e.g. dialkyl esters thereof) and ethanediol and/or butane-1,4-diol and mixtures thereof are particularly preferred.

Preferred polyalkylene terephthalates are also copolyesters which are prepared from at least two of the abovementioned diols; particularly preferred copolyesters are poly-(ethylene glycol/butane-1,4-diol)-terephthalates. The different diol radicals can be present in the copolyesters in the form of blocks or in random distribution.

The polyalkylene terephthalates in general have an intrinsic viscosity of 0.4 to 1.4 dl/g, preferably 0.5 to 1.3 dl/g, in particular 0.6 to 1.2 dl/g, in each case measured in phenol/o-dichlorobenzene (1:1 pt by wt.) at 25° C.

Suitable polyamides are known homopolyamides, copolyamides and mixtures of these polyamides. These can be partly crystalline and/or amorphous polyamides. Suitable partly crystalline polyamides are polyamide 6, polyamide 6,6 and mixtures and corresponding copolymers of these components. Partly crystalline polyamides in which the acid component consists completely or partly of terephthalic acid and/or isophthalic and/or suberic acid and/or sebacic acid and/or azelaic acid and/or adipic acid and/or cyclohexanedicarboxylic acid and the diamine component consists completely or partly of m- and/or p-xylylene-diamine and/or hexamethylenediamine and/or 2,2,4-trimethylhexamethylenediamine and/or 2,4,4-trimethylhexamethylenediamine and/or isophoronediamine and of which the composition is known in principle are furthermore possible.

Polyamides which are prepared completely or partly from lactams having 7 to 12 C atoms in the ring, optionally co-using one or more of the abovementioned starting components, are also to be mentioned.

Particularly preferred partly crystalline polyamides are polyamide 6 and polyamide 6,6 and their mixtures. Known products can be employed as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'dimenthyl-4,4'-diamino-dicyclohexyl-methane, 3-aminomethyl-3,5-5-trimethylcyclohexylamine, 2,5- and/or 2,6-bis-(aminomethyl)-norbomane and/or 1,4-diaminomethylcyclohexane, with dicarboxylic acids, such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers which are obtained by polycondensation of several monomers are also suitable, and furthermore copolymers which are prepared with the addition of aminocarboxylic acids, such as ε-aminocaproic acid, ω-aminoundecanoic acid or ω-aminolauric acid or their lactams.

Particularly suitable amorphous polyamides are the polyamides prepared from isophthalic acid, hexamethylenediamine and further diamines, such as 4,4-diaminodicyclohexylmethane, isophoronediamine, 2,2,4- and/or 2,4,4-trimethylhexamethylenediamine and 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and lauryllactam; or from terephthalic acid and the isomer mixture of 2,2,4- and 2,4,4-trimethylhexamethylene-diamine.

Instead of pure 4,4'-diaminodicyclohexylmethane, it is also possible to employ mixtures of the diaminodicyclohexylmethane position isomers, which are composed of 70 to 99 mol % of the 4,4'-diamino isomer
1 to 30 mol % of the 2,4'-diamino isomer
0 to 2 mol % of the 2,2'-diamino isomer and optionally correspondingly more highly condensed diamines, which are obtained by hydrogenation of technical-grade diaminodiphenylmethane. Up to 30% of the isophthalic acid can be replaced by terephthalic acid.

The polyamides preferably have a relative viscosity (measured on a 1 wt. % solution in m-cresol at 25° C.) of 2.0 to 5.0, particularly preferably 2.5 to 4.0.

The thermoplastic moulding compositions according to the invention can furthermore comprise flameproofing agents. Both halogen-containing and halogen-free compounds are suitable here. The flameproofing agents are in general added in an amount of 0.1 to 35, preferably 0.5 to 30 parts by wt., based on the sum of components A–D.

Suitable halogen compounds are organic chlorine and/or bromine compounds which are stable during the preparation and processing of the moulding compositions according to the invention so that no corrosive gases are released and the activity is not impaired as a result.

Halogen-containing compounds are, for example
1. Chlorinated and brominated diphenyls, such as octachlorodiphenyl, decachlorodiphenyl, octabromodiphenyl and decabromodiphenyl.
2. Chlorinated and brominated diphenyl ethers, such as octa- and decachlorodiphenyl ether and octa- and decabromodiphenyl ether.
3. Chlorinated and brominated phthalic anhydride and its derivatives, such as phthalimides and bisphthalimides, e.g. tetrachloro- and tetrabromophthalic anhydride, tetrachloro- and tetrabromophthalimide, N,N'-ethylene-bis-tetrachloro- and N,N'-ethylene-bis-tetrabromophthalimide and N-methyltetrachloro- and N-methyltetrabromophthalimide.
4. Chlorinated and brominated bisphenols, such as 2,2-bis-(3,5-di-chloro-4-hydroxyphenyl)-propane and 2,2-bis-(3,5-di-bromo-4-hydroxyphenyl)-propane.
5. 2,2-Bis-(3,5-di-chloro-4-hydroxyphenyl)-propane oligocarbonate and 2,2-bis-(3,5-di-bromo-4-hydroxyphenyl)-propane oligocarbonate with an average degree of polycondensation of 2 to 20.

Bromine compounds are preferred over the chlorine compounds, and halogen-free compounds are preferred over these.

Flameproofing agents which are preferably suitable are all the phosphorus compounds conventionally used for this purpose, in particular phosphine oxides and derivatives of acids of phosphorus and salts of acids and acid derivatives of phosphorus.

Derivatives (e.g. esters) of acids of phosphorus and salts thereof are preferred, where acids of phosphorus include phosphoric acid, phosphonic acid, phosphinic acid, phosphorous acid, also in the dehydrated form, in each case, salts are preferably alkali metal, alkaline earth metal and ammonium salts of these acids, and derivatives thereof (for example partly esterified acids) are also included.

Suitable phosphorus compounds are e.g. metal compounds of monoesters of phosphoric acid of the formula (IVa) and (IVb)

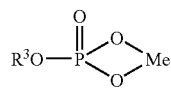

(IVa)

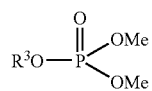

(IVb)

or metal compounds of diesters of phosphoric acid according to formula (V)

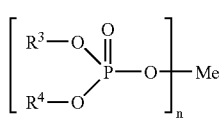

(V)

wherein

R$^3$ and R$^4$ independently of one another denote optionally halogenated C$_1$–C$_{24}$-alkyl, or C$_5$–C$_6$-cycloalkyl, C$_6$–C$_{20}$-aryl or C$_7$–C$_{12}$-aralkyl, in each case optionally substituted by halogen and/or C$_1$–C$_{10}$-alkyl, or in the case of the formula (V), R$^3$ and R$^4$ together form an alkyl chain, Me represents a metal chosen from main groups 1 and 3 and sub-groups VIII, IB and IIB of the periodic table and n is determined by the valency of the metal ion.

R$^3$ and R$^4$ independently of one another preferably represent optionally halogenated (preferably by chlorine and/or bromine) C$_1$–C$_{15}$-, in particular C$_1$–C$_{10}$-alkyl, or cyclopentyl, cyclohexyl, phenyl, naphthyl or phenyl-C$_1$–C$_4$-alkyl (such as benzyl), in each case optionally substituted by halogen (preferably chlorine and/or bromine) and/or C$_1$–C$_6$-, in particular C$_1$–C$_4$-alkyl, in particular methyl, ethyl or n- or iso-propyl.

Preferred metals Me are metals of main groups 2 and 3 and sub-group II.

Me particularly preferably represents Mg, Ca, Ba, boron, Al or Zn.

For the preparation of the phosphoric acid ester metal compounds according to the invention, processes known from the literature are suitable, such as, for example, the transesterification process starting from triesters of phosphoric acid or the acid halide process starting from phosphoryl chloride (EP-A-0 801 116 and J. Org. Chem. 1978, vol. 43, no. 1, p. 24–31).

Flameproofing agents which are furthermore suitable are phosphorus compounds of the formula (VI)

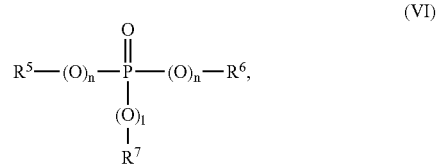

(VI)

in which

R$^5$, R$^6$ and R$^7$ independently of one another are an optionally halogenated C$_1$–C$_8$-alkyl or an optionally halogenated and/or alkylated C$_5$- or C$_6$-cycloalkyl or an optionally halogenated and/or alkylated and/or aralkylated C$_6$–C$_{30}$-aryl and "n" and "l" independently of one another are 0 or 1.

These phosphorus compounds are generally known (see, for example, Ullmann, Enzyklopädie der technischen Chemie, volume 18, pages 301 et seq., 1979). The aralkylated phosphorus compounds are described, for example, in DE-OS 38 24 356.

Optionally halogenated C$_1$–C$_8$-alkyl radicals according to (VI) can be mono- or polyhalogenated and linear or branched. Examples of alkyl radicals are chloroethyl, 2-chloropropyl, 2,3-dibromopropyl, butyl, methyl or octyl.

Optionally halogenated and/or alkylated C$_5$- or C$_6$-cycloalkyls according to (VI) are optionally mono- to polyhalogenated and/or alkylated C$_5$- or C$_6$-cycloalkyls, that is to say e.g. cyclopentyl, cyclohexyl, 3,3,5-trimethylcyclohexyl and completely chlorinated cyclohexyl.

Optionally halogenated and/or alkylated and/or aralkylated C$_6$–C$_{30}$-aryl radicals according to (VI) are optionally mono- or polynuclear, mono- or polyhalogenated and/or alkylated and/or aralkylated, e.g. chlorophenyl, bromophenyl, pentachlorophenyl, pentabromophenyl, phenyl, cresyl, isopropylphenyl, benzyl-substituted phenyl and naphthyl.

Preferably, R$^5$, R$^6$ and R$^7$ independently of one another represent methyl, ethyl, butyl, octyl, phenyl, cresyl, cumyl or naphthyl. R$^5$, R$^6$ and R$^7$ particularly preferably independently of one another represent methyl, ethyl, butyl or phenyl which is optionally substituted by methyl and/or ethyl.

Phosphorus compounds according to formula (VI) which can be employed according to the invention are e.g. tributyl phosphate, tris-(2-chloroethyl) phosphate, tris-(2,3-dibromopropyl) phosphate, triphenyl phosphate,tricesyl phosphate, diphenyl cresyl phosphate, diphenyl octyl phosphate, diphenyl 2-ethylcresyl phosphate, tri-(isopropylphenyl) phosphate, tris-(p-benzylphenyl) phosphate, triphenylphosphine oxide, methanephosphonic acid dimethyl ester, methanephosphonic acid diphenyl ester and phenylphosphonic acid diethyl ester.

Dimeric and oligomeric phosphates such as are described, for example, in EP-A-0 363 608 are also suitable flameproofing agents.

The moulding compositions according to the invention can comprise, as flameproofing agents, phosphorus compounds according to formula (VII)

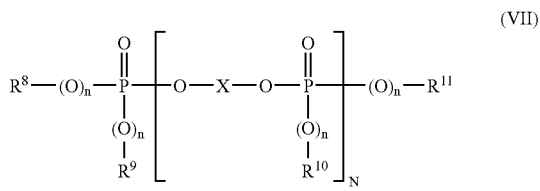
(VII)

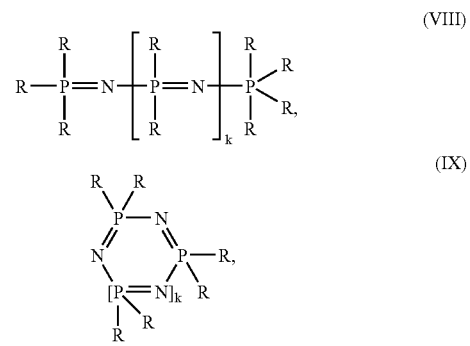
(VIII)

(IX)

In the formula, $R^8$, $R^9$, $R^{10}$ and $R^{11}$ independently of one another represent in each case optionally halogenated $C_1$–$C_8$-alkyl, $C_5$–$C_6$-cycloalkyl, $C_6$–$C_{10}$-aryl or $C_7$–$C_{12}$-aralkyl.

$R^8$, $R^9$, $R^{10}$ and $R^{11}$ preferably independently of one another represent $C_1$–$C_4$-alkyl, phenyl, naphthyl or phenyl-$C_1$–$C_4$-alkyl. The aromatic groups $R^8$, $R^9$, $R^{10}$ and $R^{11}$ can in their turn be substituted by halogen groups and/or alkyl groups, preferably chlorine, bromine and/or $C_1$–$C_4$-alkyl. Particularly preferred aryl radicals are cresyl, phenyl, xylenyl, propylphenyl or butylphenyl and the corresponding brominated and chlorinated derivatives thereof.

X in the formula (VII) denotes a mono- or polynuclear aromatic radical having 6 to 30 C atoms. This is preferably derived from diphenols of the formula (I). Diphenylphenol, bisphenol A, resorcinol or hydroquinone or chlorinated or brominated derivatives thereof are particularly preferred.

n in the formula (VII) can be, independently of one another, 0 or 1, and n is preferably 1.

N represents values from 0 to 30, preferably an average value of 0.3 to 20, particularly preferably 0.5 to 10, in particular 0.5 to 6.

Mixtures of 10 to 90 wt. %, preferably 12 to 40 wt. %, of at least one monophosphorus compound of the formula (VI) and at least one oligomeric phosphorus compound or a mixture of oligomeric phosphorus compounds as described in EP-A-363 608 and phosphorus compounds according to formula (VII) in amounts of 10 to 90 wt. %, preferably 60 to 88 wt. %, based on the total amount of phosphorus compounds, can also be employed.

Monophosphorus compounds of the formula (VI) are, in particular, tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The mixtures of monomeric and oligomeric phosphorus compounds of the formula (VII) have average N values of 0.3 to 20, preferably 0.5 to 10, in particular 0.5 to 6.

The phosphorus compounds mentioned are known (cf. e.g. EP-A-363 608, EP-A-640 655) or can be prepared by known methods in an analogous manner (e.g. Ullmanns Encyklopädie der technischen Chemie, vol. 18, p. 301 et seq. 1979; Houben-Weyl, Methoden der Organischen Chemie, vol. 12/1, p. 43; and Beilstein vol. 6, p. 177).

The phosphorus compounds which can be employed according to the invention also include linear phosphazenes according to formula (VIII) and cyclic phosphazenes according to formula (IX)

wherein

R is in each case identical or different and represents amino, in each case optionally halogenated, preferably halogenated with fluorine, $C_1$- to $C_6$-alkyl or $C_1$–$C_8$-alkoxy, or $C_5$- to $C_6$-cycloalkyl, $C_6$- to $C_{20}$-aryl, preferably phenyl or naphthyl, $C_6$- to $C_{20}$-aryloxy, preferably phenoxy or naphthyloxy, or $C_7$–$C_{12}$-aralkyl, preferably phenyl-$C_1$–$C_4$-alkyl, in each case optionally substituted by alkyl, preferably $C_1$–$C_4$-alkyl, and/or halogen, preferably chlorine or bromine, and k represents 0 or a number from 1 to 15, preferably a number from 1 to 10.

Examples which may be mentioned are:
propoxyphosphazene, phenoxyphosphazene, methylphenoxyphosphazene, aminophosphazene and fluoroalkylphosphazenes.

Phenoxyphosphazene is preferred.

The phosphazenes can be employed by themselves or as a mixture. The radical R can be always the same, or 2 or more radicals in the formulae (VIII) and (IX) can be different.

The phosphazenes and their preparation are described, for example, in EP-A 728 811, DE-A-1 961 668 and WO 97/40 092.

The moulding compositions according to the invention can furthermore comprise preferably 0.05 to 5, particularly preferably 0.1 to 1, in particular 0.1 to 0.5 parts by wt., based on the total composition, of fluorinated polyolefins. Suitable fluorinated polyolefins are of high molecular weight and have glass transition temperatures above −30° C., as a rule above 100° C. Their fluorine contents are preferably 65 to 76, in particular 70 to 76 wt. %. Their average particle diameters $d_{50}$ are in general 0.05 to 1,000, preferably 0.08 to 20 μm. The fluorinated polyolefins E in general have a density of 1.2 to 2.3 g/cm³.

Preferred fluorinated polyolefins are polytetrafluoroethylene, polyvinylidene fluoride and tetrafluoroethylene/hexafluoropropylene and ethylene/tetrafluoroethylene copolymers.

The fluorinated polyolefins are known (cf. "Vinyl and Related Polymers" by Schildknecht, John Wiley & Sons, Inc., New York, 1962, page 484 to 494; "Fluorpolymers" by Wall, Wiley-Interscience, John Wiley & Sons, Inc., New York, volume 13, 1970, page 623 to 654; "Modern Plastics Encyclopaedia", 1970–1971, volume 47, no. 10A, October 1970, McGraw-Hill, Inc., New York, page 134 and 774; "Modern Plastics Encyclopedia", 1975 to 1976, October 1975, volume 52, no. 10A, McGraw-Hill, Inc., New York, page 27, 28 and 472 and U.S. Pat. Nos. 3,671,487, 3,723,373 and 3,838,092).

They can be prepared by known processes, thus, for example, by polymerization of tetrafluoroethylene in an aqueous medium with a catalyst which forms free radicals, for example sodium peroxydisulfate, potassium peroxydisulfate or ammonium peroxydisulfate, under pressures of 7 to 71 kg/cm$^2$ and at temperatures of 0 to 200° C., preferably. at temperatures of 20 to 100° C. (For further details see e.g. U.S. Pat. No. 2,393,967). The density of these materials can be between 1.2 and 2.3 g/cm$^3$ and the average particle size between 0.05 and 1,000 µm, depending on the use form.

Preferred fluorinated polyolefins are tetrafluoroethylene polymers. They have average particle diameters of 0.05 to 20 µm, preferably 0.08 to 10 µm, and a density of 1.2 to 1.9 g/cm$^3$ and are preferably employed in the form of a coagulated mixture of emulsions of the tetrafluoroethylene polymers E with emulsions of the graft polymers C.

Suitable fluorinated polyolefins which can be employed in powder form are tetrafluoroethylene polymers with average particle diameters of 100 to 1,000 µm and densities of 2.0 g/cm$^3$ to 2.3 g/cm$^3$.

The thermoplastic moulding compositions according to the invention can furthermore comprise very finely divided inorganic compounds. The moulding compositions according to the invention preferably comprise 0.1 to 50 parts by wt., preferably 0.1 to 10 parts by wt., based on the total amount. These can preferably consist of compounds of one or metals of main groups 1 to 5 or sub-groups 1 to 8 of the periodic table, preferably main groups 2 to 5 or sub-groups 4 to 8, particularly preferably main groups 3 to 5 or sub-groups 4 to 8, with at least one element chosen from the group consisting of oxygen, sulfur, boron, phosphorus, carbon, nitrogen, hydrogen and silicon.

Preferred compounds are, for example, oxides, hydroxides, hydrated oxides, sulfates, sulfites, sulfides, carbonates, carbides, nitrates, nitrites, nitrides, borates, silicates, phosphates, hydrides, phosphites or phosphonates.

Preferred very finely divided inorganic compounds are, for example, TiN, TiO$_2$, SnO$_2$, WC, ZnO, Al$_2$O$_3$, AlO(OH), ZrO$_2$, Sb$_2$O$_3$, SiO$_2$, iron oxides, Na$_2$SO$_4$, Si, BaSO$_4$, vanadium oxides, zinc borate and silicates, such as Al silicates, Mg silicates and one-, two- and three-dimensional silicates. Mixtures and doped compounds can also be used. These nanoscale particles can furthermore be modified on the surface with organic molecules in order to achieve a better compatibility with the polymers. Hydrophobic or hydrophilic surfaces can be produced in this manner.

The average particle diameters are less than 200 nm, preferably less than 150 nm, in particular 1 to 100 nm.

Particle size and particle diameter always means the average particle diameter $d_{50}$, determined by ultracentrifuge measurements by the method of W. Scholtan et al. Kolloid-Z. und Z. Polymere 250 (1972), p. 782 to 796.

The inorganic compounds can be in the form of powders, pastes, sols, dispersions or suspensions. Powders can be obtained by precipitation from dispersions, sols or suspensions.

The powders can be incorporated into the thermoplastics by conventional processes, for example by direct kneading or extrusion of the constituents of the moulding composition and the very finely divided inorganic powders. Preferred processes are the preparation of a masterbatch, e.g. in flameproofing additives, other additives, monomers or solvents, or the co-precipitation of dispersions of components described above of the thermoplastic moulding compositions according to the invention with dispersions, suspensions, pastes or sols of the very finely divided inorganic materials.

The moulding compositions according to the invention can furthermore comprise conventional additives, such as lubricants and mould release agents, nucleating agents, antistatics, stabilizers, fillers and reinforcing substances and dyestuffs and pigments.

The moulding compositions with a filler or reinforcing substance content can comprise up to 60, preferably 10 to 40 wt. %, based on the moulding composition with a filler or reinforcing substance content, of fillers and/or reinforcing substances. Preferred reinforcing substances are glass fibres. Preferred fillers, which can also have a reinforcing effects, are glass beads, mica, silicates, quartz, talc, titanium dioxide and wollastonite.

The moulding compositions according to the invention can be prepared by mixing the constituents in a known manner and subjecting the mixture to melt compounding or melt extrusion at elevated temperatures, preferably at 200 to 350° C., in conventional devices, such as internal kneaders, extruders or twin-shaft screws. The constituents can be mixed successively or simultaneously. In specific cases it may be favourable to prepare premixes from the low molecular weight additives and the magnesium aluminium silicates.

On the basis of their very good mechanical properties, the thermoplastic moulding compositions according to the invention are suitable for the production of all types of shaped articles, in particular those with increased fracture resistance requirements.

The moulding compositions of the present invention can be used for the production of all types of shaped articles. In particular, shaped articles can be produced by injection moulding. Examples of shaped articles which can be produced are: housing components of all types, e.g. for domestic appliances, such as juice presses, coffee machines and mixers, or for office machines, such as monitors, printers or copiers, or cover sheets for the building sector and components for the motor vehicle sector. They can furthermore be employed in the field of electrical engineering, because they have very good electrical properties.

The moulding compositions according to the invention can furthermore be used, for example, for the production of the following shaped articles or mouldings:

Interior fittings for railway vehicles, hub caps, housings for electrical equipment containing small transformers, housings for equipment for data transmission and transfer, housings and linings for medical purposes, massage equipment and housings therefor, toy vehicles for children, flat wall elements, housings for safety devices, rear spoilers, thermally insulated transportation containers, devices for housing or care of small animals, mouldings for sanitary and bath fittings, cover gratings for ventilator openings, mouldings for garden and equipment sheds and housings for garden equipment.

Another form of processing is the production of shaped articles by thermoforming from previously produced sheets or films.

The invention is described in more detail in the following with reference to the examples:

EXAMPLES

Component A

A1 (Comparison—Without Drum Sieving)

Graft polymer of 40 parts by wt. of a copolymer of styrene and acrylonitrile in a ratio of 73:27 on 60 parts by wt. of particulate crosslinked polybutadiene rubber (average particle diameter $d_{50}$=0.3 μm), prepared by emulsion polymerization.

Without drum sieving, the polymer latex is precipitated in the conventional manner (by means of heat or with salts or with acids) and the precipitated material is separated off and dried.

The quality of A1 is investigated in accordance with the preparation described below for the moulding compositions (the recipe is described in table 1).

The surface had 1,000 particles>200 μm per m².

A2 (Comparison —Without Drum Sieving)

Graft polymer of 40 parts by wt. of a copolymer of styrene and acrylonitrile in a ratio of 73:27 on 60 parts by wt. of particulate crosslinked polybutadiene rubber (average particle diameter $d_{50}$=0.35 μm), prepared by emulsion polymerization.

Without drum sieving, the polymer latex is precipitated in the conventional manner (by means of heat or with salts or with acids) and the precipitated material is separated off and dried.

The quality of A2 is investigated in accordance with the preparation described below for the moulding compositions (the recipe is described in table 1).

The surface had 900 particles>200 μm per m².

A3 (According to the Invention)

Graft polymer of 40 parts by wt. of a copolymer of styrene and acrylonitrile in a ratio of 73:27 on 60 parts by wt. of particulate crosslinked polybutadiene rubber (average particle diameter $d_{50}$=0.3 μm), prepared by emulsion polymerization.

The latex is passed over a drum sieve. The throughput is 9,000 kg/h. The surface of the sieve drum is 4 m² and the mesh width of the sieves is 50 μm.

The sieved polymer latex is precipitated in the conventional manner (by means of heat or acid or with salts) and the precipitated material is separated off and dried.

The quality of A3 is investigated in accordance with the preparation described below for the moulding compositions (the recipe is described in table 1).

The surface had 100 particles>200 μm per m².

A4 (According to the Invention)

Graft polymer of 40 parts by wt. of a copolymer of styrene and acrylonitrile in a ratio of 73:27 on 60 parts by wt. of particulate crosslinked polybutadiene rubber (average particle diameter $d_{50}$=0.35 μm), prepared by emulsion polymerization.

The latex is passed over a drum sieve as in A3. The throughput is 15,000 kg/h, the surface of the drum is 4 m² and the mesh width of the sieves is 100 μm.

The sieved polymer latex is precipitated in the conventional manner (by means of heat or acid or with salts) and the precipitated material is separated off and dried.

The quality of A4 is investigated in accordance with the preparation described below for the moulding compositions (the recipe is described in table 1).

The surface had 150 particles>200 μm per m².

Component B

Linear polycarbonate based on bisphenol A with a relative solution viscosity of 1.252, measured in $CH_2Cl_2$ as the solvent at 25° C. and in a concentration 0.5 g/100 ml.

Component C

Styrene/acrylonitrile copolymer with a styrene/acrylonitrile ratio of 72:28 and a limiting viscosity of 0.55 dl/g (measurement in dimethylformamide at 20° C.).

Preparation and Testing of the Moulding Compositions According to the Invention

Components A–C are mixed on a 3 l internal kneader.

The moulding compositions were processed on an extruder, extruded to tapes of 50 to 70 mm width and 200 μm thickness and tested for surface homogeneity with an FS-3 film quality test apparatus from OCS GmbH, Witten, Germany. The shaped articles are produced on an injection moulding machine of the type Arburg 270 E at 260° C.

The notched impact strength $A_k$ is determined in accordance with the method of ISO 180/1A on bars of dimensions 80×10×4 mm at room temperature.

The elongation at break DR is determined in the context of determination of the modulus of elasticity in tension in accordance with the method of ISO 527 on F3 dumbbell-shaped bars.

TABLE 1

Compositions and properties of the ABS moulding compositions

| Contents by weight | Example | | | |
|---|---|---|---|---|
| | 1 | 2 (comparison) | 3 | 4 (comparison) |
| Components | | | | |
| A1 | — | 40 | — | — |
| A2 | — | — | — | 40 |
| A3 | 40 | — | — | — |
| A4 | — | — | 40 | — |
| C | 60 | 60 | 60 | 60 |
| Properties | | | | |
| $A_k$ (ISO 180/1 A) kJ/m² | 19.0 | 14.6 | 21.1 | 19.5 |
| DR (ISO 527) % | 17.4 | 8.6 | 9.6 | 6.7 |
| Particles/m² | 100 | 1,000 | 150 | 900 |

TABLE 2

Composition and properties of the polycarbonate ABS moulding compositions

| Contents by weight | Example | | | |
|---|---|---|---|---|
| | 5 (comparison) | 6 | 7 (comparison) | 8 |
| Components | | | | |
| A1 | 24.0 | — | — | — |
| A2 | — | — | 24.0 | — |
| A3 | — | 24.0 | — | — |
| A4 | — | — | — | 24.0 |
| B | 43.0 | 43.0 | 43.0 | 43.0 |
| C | 33.0 | 33.0 | 33.0 | 33.0 |
| Properties | | | | |
| $A_k$ (ISO 1801 A) kJ/m² | 81.1 | 90.0 | 72.1 | 92.8 |
| DR (ISO 527) % | 35.5 | 80.2 | 15.8 | 79.5 |
| Particles /m² | 1,000 | 100 | 900 | 150 |

The invention claimed is:

1. Process for the preparation of homo- and/or copolymers of one or more ethylenically unsaturated monomers by means of emulsion and/or suspension polymerization, which contain less than 400 particles per m² of surface area with a diameter greater than 200 μm, the determination of the particles with a diameter treater than 200 µm per m² of surface area being carried out with an FS-3 film quality test apparatus from OCS GmbH, Witten, Germany, characterized in that the aqueous polymer stream for purification is passed into a drum sieve which rotated slowly or in cycles, with an average mesh width of ≦200 µm, and coarse fractions which remain are transported away from the filtration site by the rotary movement of the drum and are removed in the upper part of the drum by means of spraying under pressure by suitable rinsing media and suitable scrapers.

2. Process according to claim 1, characterized in that the drum sieve has an average mesh width of ≦150 µm.

* * * * *